Dec. 1, 1959  J. P. POOLE  2,915,638
METHOD AND APPARATUS FOR MANUFACTURING GLASSWARE
Filed Nov. 10, 1954  2 Sheets-Sheet 1

Dec. 1, 1959 J. P. POOLE 2,915,638
METHOD AND APPARATUS FOR MANUFACTURING GLASSWARE
Filed Nov. 10, 1954 2 Sheets-Sheet 2
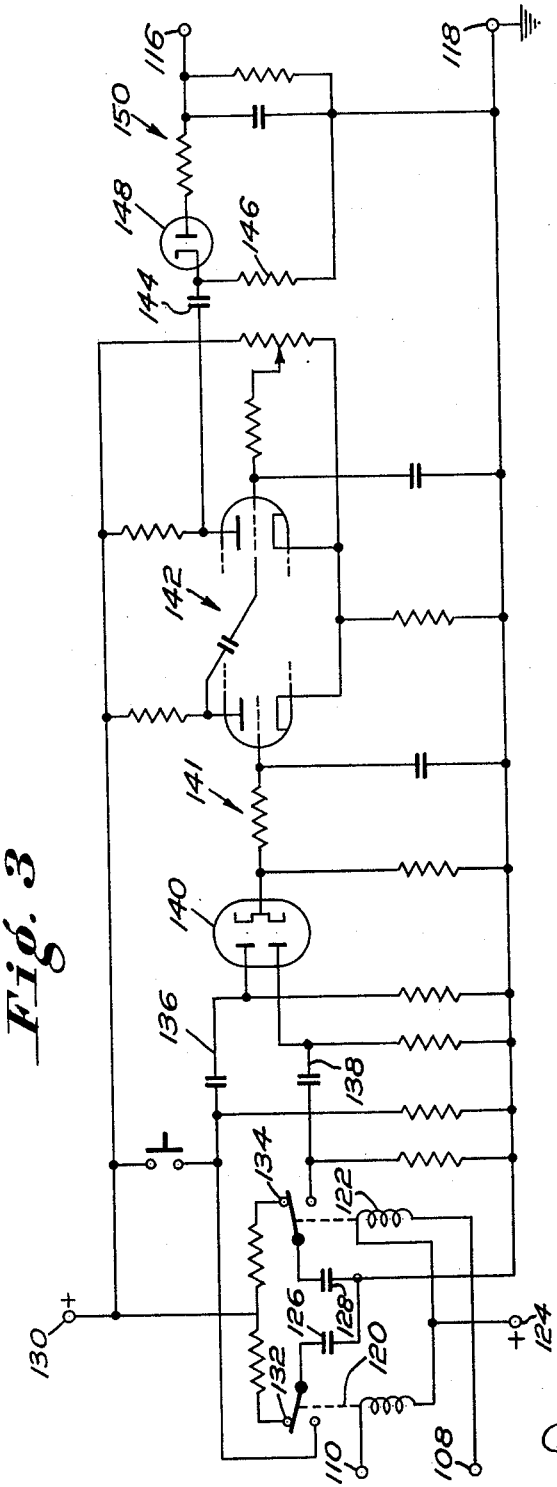
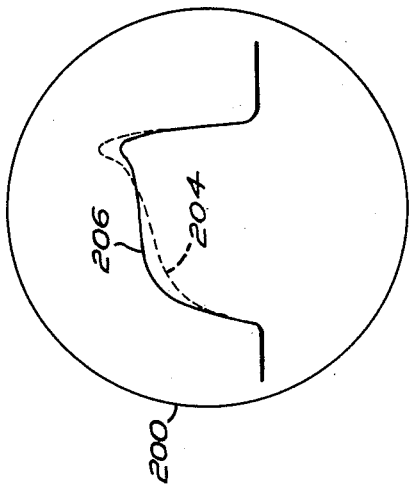
Fig. 2
Fig. 3
INVENTOR.
JAMES P. POOLE
BY
Beau, Brooke, Buckley & Beau,
ATTORNEYS

United States Patent Office

2,915,638
Patented Dec. 1, 1959

2,915,638

METHOD AND APPARATUS FOR MANUFACTURING GLASSWARE

James P. Poole, Brockway, Pa., assignor to Brockway Glass Company, Inc., Brockway, Pa.

Application November 10, 1954, Serial No. 468,049

6 Claims. (Cl. 250—83.3)

This invention relates to a novel method and apparatus for use in the manufacture of glass containers and the like.

One of the most common methods of manufacturing glass articles such as glass bottles and jars or similar glass containers on a mass production basis is by means of blowing machines wherein gobs are fed successively to blank molds where they are primarily formed into individual blanks or parisons and then automatically transferred to blow molds where they are blown to final form.

The shape of the parison and its temperature, or more specifically the distribution of glass in the parison and the temperature of the glass at various parts along the length of the parison, vitally affect the shape and other characteristics of the ultimate article. The ability to make adjustments to regulate and control the distribution and relative temperature of glass in the parison is an important factor in successful operation.

The external shapes of both the parisons and the finally blown containers are accurately determined by the cavities in the blank or parison molds and the blow molds. Therefore, variations in glass distribution are evidenced by variations in wall thickness which are dependent entirely upon variations in the shape and disposition of the hollow interiors of both the parisons and the finally blown articles. Other things being equal, the wall thickness at various parts of a finally blown container will depend entirely upon the glass distribution or wall thickness in various parts of the parison and the temperature of the glass at various parts along the parison.

The production of glass containers by means of automatic machinery depends largely for success on the accurate and precise control of procedures and physical conditions obtaining at various stages of fabrication. Nevertheless, the actual physical measurement of physical conditions such as relative conditions of temperature at the actual forming machine for control and design purposes has been notably lacking. This has probably been attributable largely to the technical difficulty of effecting useful measurements and also to a failure to recognize the kinds of measurements which might be usefully employed to determine and guide the regulation of conditions which affect the end result.

Such conditions and factors include the timing of the various stages of operation of the automatic forming machines, the degree and regulation of cooling, blowing pressures at both the blank molds and the blow molds, the temperature of the blowing air, the designs of the blank molds and the blow molds, and other factors and conditions.

The present invention provides a method and means whereby instantaneous temperature measurements of the articles may be obtained at any position on the machine and, more importantly, whereby the comparative temperatures at various parts of the article may be determined substantially instantaneously. In addition to the various control possibilities outlined generally above, this direct information is extremely useful in duplicating previous job set-ups in the manufacture of a specific container or the like and greatly facilitates trouble-shooting when undesirable deviations in operation and result occur.

Fundamentally, the method and means of the present invention resides in using and measuring infra-red radiation from the hot glass as an instantaneous indicator of glass temperature. Actual temperature measurements may be made anywhere in the forming cycle and, more importantly, a series of successive readings may be made at high speed to give accurate relative temperature differences along a glass body as it passes a given measuring point or zone. Thus, the temperature distribution or gradient along a glass gob moving from a feeder to a blank mold could be measured and graphically reproduced as the gob flashed by a given measuring point. Also, the temperature differences in gobs having to move varying distances to various sections of a forming machine may be determined by employing the principles of the method and apparatus of the present invention.

In like manner the varying temperature along the length of a parison may be reproduced as it passes from a blank mold to a blow mold, and this information is highly useful in adjusting blank design, timing, and cooling during the invert operation.

The principles of operation are generally as follows. An infra-red sensitive photo-tube is exposed to radiation from the hot glass bodies. The field of the tube is small so that definite positions on the glass bodies can be measured. The output of the photo-tube is dependent on the amount of infra-red energy it receives which is of course dependent on the temperature of the radiating hot glass. The output from the photo-tube is amplified and fed into an oscilloscope and the output of the oscilloscope is a picture of a temperature vs. length curve which appears on the face of the cathode ray tube of the oscilloscope.

This curve is an instantaneous plot of temperature of the gob or parison against its length for the cycle measured. Since in general the thickest parts of the glass bodies are also the hottest, this radiation information is indicative of the shape of the body as well. In measuring parisons, for instance, a measurement is made on each section of the machine and the curves compared. Assuming one correct curve, which may be determined empirically by machine operation and experience, the machine is adjusted until all curves are identical.

By way of example, the following specification describes and the accompanying drawing illustrates schematically one application of the method and apparatus of the present invention. It is to be understood, however, that many modifications may be made without departing from the invention which is limited only as defined in the appended claims.

Fig. 2 is an enlarged showing of the viewing screen of the apparatus of Fig. 1, showing a pair of typical curves displayed thereby for comparison purposes in accordance with the invention; and Fig. 3 is a schematic circuit diagram of a portion of the apparatus of Fig. 1.

Figure 1:
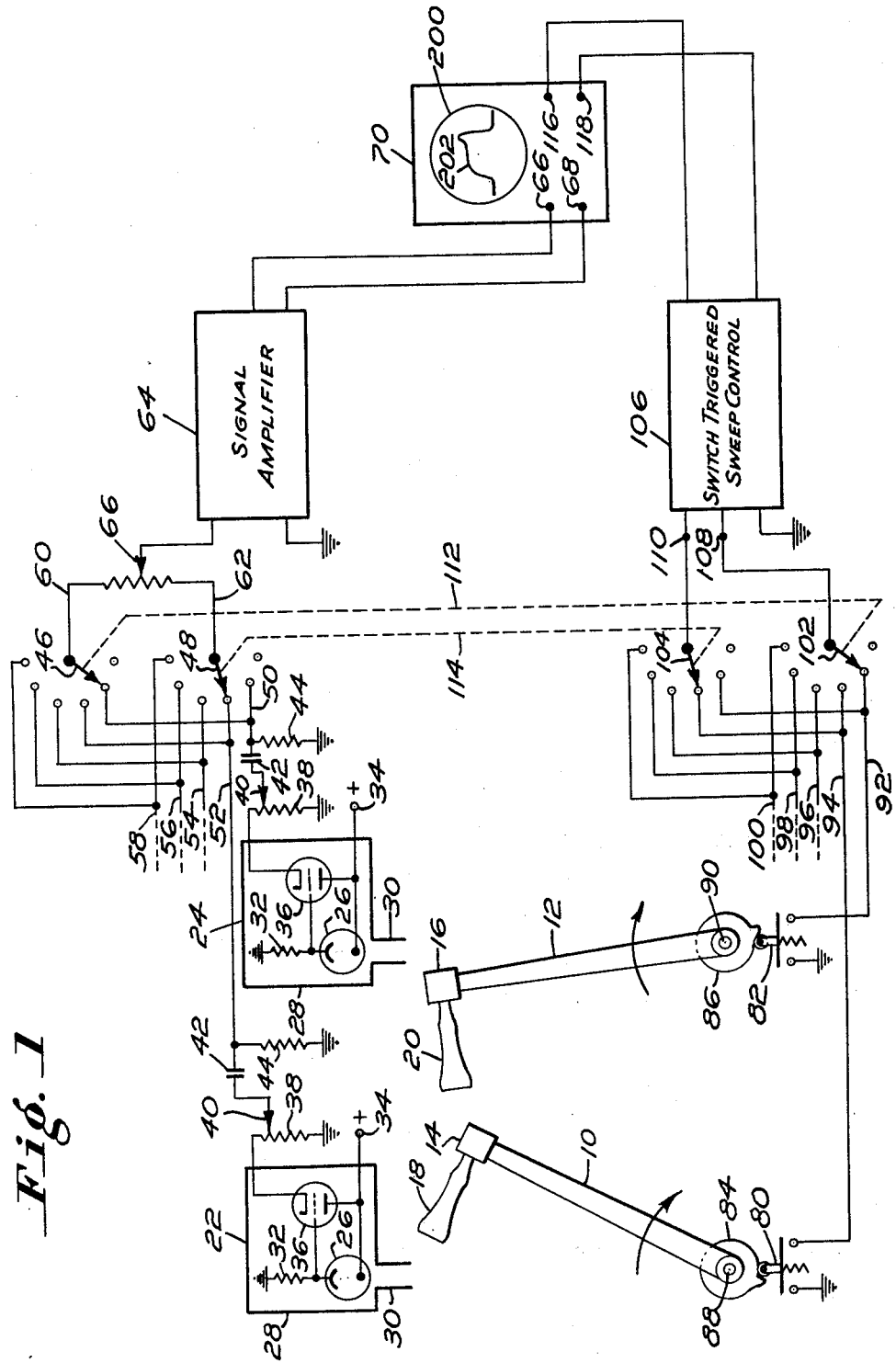
Fig. 1 is a schematic diagram of one form of the apparatus of the invention as employed in the monitoring of operating conditions of a glass-forming machine.

Referring more particularly to the drawings, Fig. 1 illustrates infra-red pattern detecting and comparing apparatus as used with and incorporated into a bottle blowing machine for scanning parisons produced thereby. The bottle blowing machine itself may be of conventional type such as for example a "Hartford Empire IS (Individual Section)" type bottle blowing machine which is well known in the art, although it will be understood that the present invention is applicable generally to various types of bottle blowing or other glass processing machines, especially where operation of the machine in the customary manner includes a manufacturing or glass body handling step at which a partially formed product piece, or still hot finished product piece, is passed or transferred from one position on the machine or apparatus to another.

In a typical bottle blowing machine, parisons which have been formed in parison molds at a plurality of stations on the machine are transferred automatically from the parison molds to blow molds at the respective stations in the grip of bottle neck mold members, the neck mold members being arranged for successive cooperation with the parison and blow mold structures and for parison transferring movement therebetween. This type of mechanism is very well known in the art and therefore the diagrammatic showing of Fig. 1 illustrates only swingingly mounted transfer arms 10, 12 carrying the neck ring or mold members 14, 16 of two of the several operating stations of a typical machine, together with parisons 18, 20 in different stages of transfer by that structure.

In accordance with the invention, an infra-red sensing device 22, 24 is provided at each station in position to scan the corresponding parisons as the latter are moved past during their respective transfers. In the illustrated apparatus, each infra-red sensing device comprises a photoelectric cell 26 housed within a suitable light shield 28 having a scanning aperture 30 adjacent the parison transfer path of the corresponding station of the machine.

Each cell 26, 26 is provided with conventional circuitry for its operation, in accordance with the type of cell used; in this case each is provided with a load resistor 32 and is connected in series therewith between a suitable source of positive potential 34 and ground, and the output signal of each such circuit is separately amplified by a tube 36 having a load resistor 38 as shown.

Preferably, means are provided to utilize and compare the outputs of at least two such detector devices, and to this end the output of each is taken at a variable tap or pick-off 40 on the corresponding amplifier load resistor so that the response of the plural units may be equalized, the signal being transmitted through a D.C. blocking condenser 42 to prevent circulating D.C. currents when two such devices are connected in parallel for comparison of their outputs. This parallel connection is provided by a pair of selector switches 46, 48 by adjustment of which any two of the several signal output lines 50, 52, 54, 56, 58 leading from detectors at the various molding stations of the machine may be placed in parallel input relation through lines 60, 62 to a common signal amplifier 64.

Preferably this parallel input signal circuit includes a potentiometer arrangement 66 for balancing out inequalities in the respective circuit branches.

Means are provided to display the amplified outputs of the selected detectors in graphic form, and for this purpose the output of the signal amplifier 64 is connected to the vertical axis input 66, 68 of a cathode ray oscilloscope 70, and the horizontal sweep of the oscilloscope is coordinated with the scanning of parisons by the selected detector devices. As referred to above the trace on the oscilloscope screen is a "picture" of the dimensional and temperature characteristics of the parisons scanned and therefore external synchronization of the oscilloscope sweep is preferred, such synchronization being derived from the physical movement of the parison supporting machine structure. In the illustrated embodiment of the invention this synchronization is provided by a cam switch 80, 82 for each detector equipped station of the machine, these cam switches being operated by cam means 84, 86 fixed on or otherwise operatively linked to the operating shafts or mechanism 88, 90 of the several parison transfer elements 10, 12. Circuit lines 92, 94, 96, 98, 100 closable by the several corresponding cam switches are employed selectively or in selected pairs by selector switches 102, 104 to trigger the sweep of the oscilloscope 70 through a sweep control circuit 106 having input terminals 108, 110 connected to the cam switch selector switches 102, 104 respectively, the circuits being completed through ground as shown. Preferably the cam switch selector switches 102, 104 are ganged as shown with the corresponding signal selector switches 46, 48, and for this purpose the corresponding switches of each set may be in the form of "decks" of multideck rotary switches 112, 114.

It will be understood that any suitable circuit arrangement may be employed to synchronize the horizontal sweep of the oscilloscope with the closure of the cam switch or switches placed in a circuit therewith by the selector switches 102, 104. For example in some installations it may be desirable to employ commercially available oscilloscope equipment of the type in which the sweep is triggered by a simple closure of a circuit between two terminals on the oscilloscope equipment. In this case the terminals 108, 110 would actually be a single terminal with the two selector switches 102, 104 connected thereto, and the control circuitry indicated at 106 would be internal of the commercially supplied oscilloscope unit. On the other hand, where the oscilloscope unit 70 is of the type having a single sweep generator triggerable by an external synchronization pulse, then it will be understood that the circuitry indicated at 106 will comprise a pulse generator device which will supply a suitable pulse to the synchronization terminals 116, 118 of the oscilloscope 70 each time a selector switch connected cam switch 80, 82 is closed.

As an example only of typical equipment of this type, a suitable pulse generator is illustrated in Fig. 3 and comprises a pair of relays 120, 122 the operating coils of which are connected between the terminals 108, 110 and a source of voltage 124 for energization by and upon completion of the coil exciting circuit to ground through a selected cam switch as shown. A pair of condensers 126, 128 are connected to be charged from a voltage source 130 through normally closed terminals 132, 134 of the relays 120, 122. Energization of either relay will connect the corresponding condenser through a suitable network 136 or 138 and a polarity discriminating diode 140 to the input circuitry 141 of a "one shot" multivibrator 142 as shown. The output of the multivibrator is then differentiated by a condenser resistor combination 144, 146 and the positive pulse is eliminated by another diode 148 and after further shape modification by an output network 150 the cam switch triggered pulse is supplied to the "external synchronization" terminals 116, 118 of the oscilloscope. As stated above the circuitry illustrated in Fig. 3 is for illustration of a typical arrangement only and the operating principles thereof will be readily understood by those skilled in the electronic arts. For the purposes of the present invention and more particularly of the illustrated embodiment thereof it is only necessary that any convenient circuitry be provided whereby a horizontal sweep, preferably a single sweep, of the oscilloscope will be initiated upon the closure of any selected one of the cam switches, or upon the closure of each of a selected group thereof, which cam switches are in turn operated in synchronization with the parison movements as aforesaid. It will be understood also that such a sweep deflection once initiated is usually linear at a rate preset by the circuit adjustments in the conventional sweep generator itself, and that is the arrangement preferred in the illustrated embodiment of the invention.

In the use of the apparatus in accordance with the invention, it will be understood that the various sensitivity and timing adjustments are made so that each detector devices will have the same sensitivity and the sweep generating means will provide a single horizontal sweep in properly timed relation to the passage of each parison scanned. Then either or both of the selector switches 112, 114 will be moved to a selected operative position. For example, as shown in Fig. 1 the selector switch 114 may be adjusted for detection of radiation by one particular detector device 22 while the selector switch 112 may be adjusted for employing another detector device 24 at a different station on the machine.

Assuming the selector switch setting and the instantaneous positions of the machine parts as shown in the figure for example, a parison 18 at a station of the machine corresponding to the detector 22 has just passed the scanning aperture 30 of that detector. Just prior to the arrival of the parison at the scanning aperture, the switch 80 had been tripped by the cam 84 thereby closing a trigger control circuit through selector switch 104 to the sweep control 106 to initiate a horizontal sweep of the oscilloscope beam, the speed of this sweep being preset in the usual manner so that once initiated, the horizontal deflection continued for a time and at a rate corresponding to the scanning movement of the parison.

As the parison 18 proceeded past the scanning aperture 30, the cell 26 responded to the radiation therefrom, and the instantaneous response of the cell 26 was amplified and plotted on the screen 200 of the oscilloscope against the time-length base provided by the sweep apparatus, thereby producing a curve or pattern 202 which is an instantaneous plot of the radiation versus the length of the parison. Since, as discussed above, this radiation distribution curve is indicative of various operating conditions of the machine, it will be seen that once a curve is determined empirically to be indicative of proper operating conditions, it is only necessary for the operator to adjust the machine until the curve 202 matches that empirical curve.

Often one station of the machine is operating at optimum conditions, and it is desired to match the other stations to the operating conditions of that properly operating station. For this reason and for any other occasion when it would be desirable to compare a second station to the first, or to compare any two stations, the parallel switch arrangement is provided through the dual selector switches 112 and 114. As shown in Fig. 1, the selector switch 112 has been set to employ a second detector 24 at a second station on the machine, feeding the output signal of that detector to the vertical deflection circuits of the oscilloscope and initiating a horizontal sweep in timed relation with the scanning of the corresponding parison 20.

Referring to Fig. 2 in conjunction with the arrangement of Fig. 1, a pair of curves 204, 206 are shown on an enlarged view of the oscilloscope screen 200. The showing of Fig. 2 may be considered to be taken an instant after that of Fig. 1, so that both the parisons 18 and 20 have been scanned in succession, the scan of the parison 18 having produced a first curve 204 while the scan of the second parison 20 produced a second curve 206. It will be seen that if the persistence of the screen is sufficient the trace of curve 206 will be displayed while the prior trace of curve 204, although fading, still persists for direct comparison. Alternatively any conventional oscilloscope trace photographing techniques may be used for comparison of the two curves, either by a double exposure showing or by successive exposures, as desired. In any event it will be seen that the successive showings of curves corresponding to parisons at selected stations may be displayed by the equipment of the invention in such manner as to enable comparision of the curves and thus facilitate adjustment of the machine until one curve matches the other or each matches a predetermined pattern, as desired.

In view of the foregoing it will be seen that the method and apparatus of the invention provides for facile and continuous monitoring of the operations of glass forming machines and the like as reflected by both the temperature and mass distributions of the glass bodies formed or processed thereby, enabling the operator thereof to make adjustments in machine operation as needed.

What is claimed is:

1. In combination with a glass bottle blowing machine having a plurality of molding stations each comprising a parison mold and a corresponding blow mold, and transfer means conveying hot glass parisons from said parison molds to the corresponding blow molds, apparatus for measuring the temperature of the glass parisons for enabling precision adjustments in the operation of said machine for rendering the temperatures of the parisons uniform from station to station for standardizing the quality of the bottles blown by said machine, said apparatus infra-red detector means at each of said stations having a narrow sensitive field arranged to scan the parisons individual during such transfer, oscilloscope means adapted to display the output of any of said detector means as a radiation versus scanned length curve, and selector means adapted and arranged to bring a plurality of said detector means into signal input relation with said oscilloscope means for comparative display of the outputs of the selected detector means.

2. In combination with a glass bottle blowing machine having a parison mold and a blow mold and transfer means for conveying hollow hot glass parisons therebetween, apparatus for measuring mass distribution and temperature gradients along individual ones of the glass parisons for enabling control of machine parameters related to said mass distribution and temperature gradients, said apparatus comprising infra-red detector means having a narrow sensitive field arranged to scan said individual parisons during such transfer, and oscilloscope means for displaying the output of said detector means, said oscilloscope means comprising a cathode ray tube, signal responsive beam deflection means connected to the output of said detector means, and beam sweep means comprising means triggered by said transfer means for providing a sweep signal in coordination with said scan.

3. In combination with a glass container manufacturing apparatus having means for transferring a series of hot glass parisons past a position on the apparatus in succession, means for measuring mass distribution and temperature gradient characteristics along individual ones of said glass parisons for enabling variation of apparatus factors determinative of said characteristics, comprising infra-red detector means having a narrow scanning field at said position arranged to scan successive parts of said parisons during such transfer, and oscilloscope means connected to display the output of said detector means in graphic form, said oscilloscope means comprising means triggered by said transfer means for providing a graph base for showing the detector output in coordination with the scanning movement of each of a plurality of said parisons in said series past said detector means.

4. In combination with a glass container manufacturing apparatus having means for transferring hot glass parisons past a position on the apparatus, means for measuring mass distribution and temperature gradient characteristics along an individual one of said glass parisons for enabling variation of apparatus factors determinative of said characteristics, comprising infra-red detector means having a narrow scanning field at said position arranged to scan successive parts of said parison during such transfer, and oscilloscope means adapted and arranged to display the output of said detector means in graphic form as a radiation versus scanned length curve.

5. In combination with a glass container manufacturing apparatus having means for transferring a series of hot glass parisons past a position on the apparatus, means for measuring radiation productive internal characteristics of said glass parisons for enabling variation of apparatus factors determinative of said characteristics, comprising infra-red detector means adapted and arranged to detect infra-red radiation from an individual one of said parisons during such transfer, and measuring means responsive to the output of said detector means.

6. In combination with a glass container manufacturing apparatus having a plurality of sections and means transferring hot glass parisons at each section, means for measuring radiation productive internal characteristics of the glass parisons for enabling variation of apparatus factors determinative of said characteristics for rendering said characteristics of the parisons uniform from station to station for standardizing the containers manufactured by said machine, said apparatus comprising infra-red detector means at each of said stations adapted and arranged to detect said radiation from said parisons of the corresponding station during such transfer, and measuring means responsive to the output of any of said detector means for comparison of the outputs of the detector means.

References Cited in the file of this patent

UNITED STATES PATENTS

| | | |
|---|---|---|
| 1,941,552 | Henry et al. | Jan. 2, 1934 |
| 2,193,606 | Ulrey | Mar. 12, 1940 |
| 2,233,285 | Gilbert et al. | Feb. 25, 1941 |
| 2,642,538 | Urbach | June 16, 1953 |
| 2,666,854 | Hutchins | Jan. 19, 1954 |
| 2,742,578 | Nicolson et al. | Apr. 17, 1956 |